United States Patent
Slovacek (10) Patent No.: US 10,469,623 B2
(45) Date of Patent: Nov. 5, 2019

(54) PHRASE LABELING WITHIN SPOKEN AUDIO RECORDINGS

(71) Applicant: ZOOM International a.s., Prague (CZ)

(72) Inventor: Vaclav Slovacek, Prague (CZ)

(73) Assignee: ZOOM International a.s., Prague (CZ)

( * ) Notice: Subject to any disclaimer, the term of this patent is extended or adjusted under 35 U.S.C. 154(b) by 0 days.

(21) Appl. No.: 16/201,758

(22) Filed: Nov. 27, 2018

(65) Prior Publication Data

US 2019/0089816 A1    Mar. 21, 2019

Related U.S. Application Data (63) Continuation-in-part of application No. 15/628,590, filed on Jun. 20, 2017, which is a continuation of application No. 14/968,826, filed on Dec. 14, 2015, now Pat. No. 9,686,377, which is a continuation of application No. 13/359,484, filed on Jan. 26, 2012, now Pat. No. 9,215,266.

(51) Int. Cl.
| | |
|---|---|
| *H04L 29/08* | (2006.01) |
| *H04W 4/02* | (2018.01) |
| *H04L 29/06* | (2006.01) |
| *G06F 9/451* | (2018.01) |
| *G06F 3/14* | (2006.01) |
| *G10L 15/08* | (2006.01) |
| *G10L 25/54* | (2013.01) |

(52) U.S. Cl.
CPC ............ *H04L 67/34* (2013.01); *G06F 3/1454* (2013.01); *G06F 9/453* (2018.02); *G10L 15/08* (2013.01); *G10L 25/54* (2013.01); *H04L 67/02* (2013.01); *H04L 67/06* (2013.01); *H04L 67/36* (2013.01); *H04L 67/42* (2013.01); *H04W 4/02* (2013.01); *G10L 2015/088* (2013.01)

(58) Field of Classification Search
CPC ......... H04L 67/34; H04L 67/02; H04L 67/06; H04L 67/36; H04L 67/42; G06F 9/453; G06F 3/1454; H04W 4/02
See application file for complete search history.

(56) References Cited

U.S. PATENT DOCUMENTS

| | | | |
|---|---|---|---|
| 6,823,309 B1 * | 11/2004 | Kato | ............ G10L 13/10 704/267 |
| 7,092,888 B1 * | 8/2006 | McCarthy | ............ G10L 15/063 379/88.01 |
| 7,567,896 B2 * | 7/2009 | Coorman | ............ G10L 13/06 704/10 |

(Continued)

*Primary Examiner* — Blake J Rubin
(74) *Attorney, Agent, or Firm* — Brian R. Galvin; Galvin Patent Law, LLC (57) ABSTRACT

A system and method for multi-language phrase identification within spoken interaction audio capable of adjusting for regional pronunciation (accents), cadence differences, and homologs. In this system, a spoken interaction audio data store supplies spoken audio data such as contact center call recordings to be analyzed for a specific phrase or set of phrases. Phrases are entered as natural language text and converted to the phonemes representative of the phrase audio using the invention's language packs and stored in a data store. Spoken interaction and phrase audio are converted to a digital format allowing comparison using multiple characteristics. Phrase matches are stored for subsequent post analysis display and analytics generation.

6 Claims, 8 Drawing Sheets

(56) References Cited

U.S. PATENT DOCUMENTS

| | | | |
|---|---|---|---|
| 8,069,044 B1* | 11/2011 | Moorer | G06F 16/683 704/254 |
| 8,483,672 B2 | 7/2013 | Goldfarb et al. | |
| 8,897,437 B1* | 11/2014 | Tan | H04M 3/5175 379/265.02 |
| 9,240,178 B1* | 1/2016 | Nadolski | G10L 13/04 |
| 9,558,733 B1* | 1/2017 | Korn | G10L 13/08 |
| 2003/0182111 A1* | 9/2003 | Handal | G09B 5/04 704/231 |
| 2004/0215451 A1* | 10/2004 | Macleod | G10L 21/00 704/231 |
| 2005/0114137 A1* | 5/2005 | Saito | G10L 13/10 704/260 |
| 2006/0149558 A1* | 7/2006 | Kahn | G10L 15/063 704/278 |
| 2006/0289622 A1* | 12/2006 | Khor | G06Q 30/02 235/375 |
| 2007/0038455 A1* | 2/2007 | Murzina | G10L 15/187 704/263 |
| 2007/0067174 A1* | 3/2007 | Verma | G10L 21/06 704/276 |
| 2007/0203703 A1* | 8/2007 | Yoshida | G10L 13/07 704/260 |
| 2008/0046247 A1* | 2/2008 | Kurata | G10L 13/04 704/260 |
| 2008/0195391 A1* | 8/2008 | Marple | G10L 13/06 704/260 |
| 2009/0150152 A1* | 6/2009 | Wasserblat | G06F 16/61 704/254 |
| 2009/0234652 A1* | 9/2009 | Kato | G10L 13/033 704/260 |
| 2009/0305203 A1* | 12/2009 | Okumura | G09B 5/06 434/185 |
| 2010/0223056 A1* | 9/2010 | Kadirkamanathan | G10L 13/08 704/235 |
| 2012/0029918 A1* | 2/2012 | Bachtiger | G06F 16/60 704/235 |
| 2012/0065961 A1* | 3/2012 | Latorre | G10L 13/07 704/9 |
| 2012/0158989 A1* | 6/2012 | Patil | G06Q 30/02 709/235 |
| 2012/0203776 A1* | 8/2012 | Nissan | G06F 16/685 707/728 |
| 2014/0100848 A1 | 4/2014 | Shaffer et al. | |
| 2015/0025887 A1* | 1/2015 | Sidi | G10L 17/02 704/245 |
| 2015/0279359 A1* | 10/2015 | Velasco | G10L 25/63 704/257 |
| 2016/0232899 A1 | 8/2016 | Chen et al. | |
| 2016/0372116 A1* | 12/2016 | Summerfield | G10L 25/63 |
| 2018/0261219 A1* | 9/2018 | Brooks | G06Q 10/06398 |
| 2018/0308487 A1* | 10/2018 | Goel | G10L 15/1815 |

* cited by examiner

Customer interactions with the phrase "Cancel my subscription" — 410

- Ag 1 02082015:14.53 — 411
- Ag 16 02102015:09.27 — 412
- Ag 3 02102015:13.11 — 413
- Ag 47 02112015:17.03 — 414
- Ag 1 02142015:11.37 — 415
- Ag 24 02182015:12.44 — 416
- Ag 9 02242015:10.04 — 417
- Ag 36 03022015:11.13 — 418
- Ag 15 03162015:13.10 — 419

420

421 — Customer interaction Ag 16 02102015:09.27

422 — Ag 16 Track   428a—#   #—428b   %—427a   #—428c

Customer Track   426a—&   @—425a   426b—&@&   &
Time (min)   0.5   1   1.5   2   2.5   3
423 424                              425b  426d
                                     426c @ = I do not want — 425
& = cancel my subscription — 426
% = special discount price — 427
# = resolve your issue — 428

PHRASE LABELING WITHIN SPOKEN AUDIO RECORDINGS

CROSS-REFERENCE TO RELATED APPLICATIONS

This application is a continuation-in-part of U.S. patent application Ser. No. 15/628,590, titled "SYSTEM AND METHOD FOR ZERO-FOOTPRINT SCREEN CAPTURE", filed on Jun. 20, 2017, which is a continuation of U.S. patent application Ser. No. 14/968,826, titled "SYSTEM AND METHOD FOR ZERO-FOOTPRINT SCREEN CAPTURE", filed on Dec. 14, 2015, now issued as U.S. Pat. No. 9,686,377 on Jun. 20, 2017, which is a continuation of U.S. patent application Ser. No. 13/359,484, titled "SYSTEM AND METHOD FOR ZERO-FOOTPRINT SCREEN CAPTURE", filed on Jan. 26, 2012, now issued as U.S. Pat. No. 9,215,266 on Dec. 15, 2015, the entire specification of each of which is incorporated herein by reference in their entirety.

BACKGROUND OF THE INVENTION

Field of the Art

The disclosure relates to the field of client interactions, and more particularly to the field of isolating and labeling phrases within contact center audio recordings.

Discussion of the State of the Art

In the field of telecommunications, particularly in contact centers, calls are frequently recorded and reviewed for such purposes as monitoring center operations, insuring customer needs are addressed, to satisfy legal requirements or for reviewing contact center agent performance. Reviewing these recordings has largely remained a time-consuming, manual process where a call analyst must listen to entire calls, even when the focus of the call review is to determine whether and when a particular phrase was said, how many times the phrase was said, when during the spoken interaction between a contact center agent and a customer the phrase was used, and possibly what led up to or followed the utterance of the phrase of interest.

Recently, the use of keyword recognition and marking within recorded call audio has reduced the analysis overhead somewhat in that a reviewer can now potentially hop from keyword instance to keyword instance in a recording, but use of a single word, even when very skillfully selected invariably leads to a number, often a large number, of false positives when one is actually searching for utterance of a phrase, and removing the false references from the metadata while retaining the true, desired references becomes a task in itself. Many automated speech recognition systems work only in a single language, causing problems for businesses with customers from different countries. Regional pronunciation, cadence differences, and homologues in the language cause further difficulties in identifying keywords and phrases.

What is needed, is a multi-language system and method capable of adjusting for regional pronunciation (accents), cadence differences, and homologues, that identifies and marks the use of specific phrases of interest to a reviewer within spoken audio recordings such as contact center calls which thus allows both recordings that include the phrase to be easily determined and further, the time points of phrase usage within individual recordings to be visualized and directly accessed.

SUMMARY OF THE INVENTION

Accordingly, the inventor has conceived and reduced to practice, a multi-language system and method capable of adjusting for regional pronunciation (accents), cadence differences, and homologues, that identifies and marks the use of specific phrases of interest to a reviewer within spoken audio recordings such as contact center calls which thus allows both recordings that include the phrase to be easily determined and further, the time points of phrase usage within individual recordings to be visualized and directly accessed.

According to a preferred embodiment of the invention, a system for phrase identification and phrase usage display within streams of spoken audio comprising an audio analysis engine stored in a memory of and operating on a processor of a computing device, a phrase data store stored in a memory of and operating on a processor of a computing device, and an interaction manager stored in a memory of and operating on a processor of a computing device. Wherein, the audio analysis engine receives streams of spoken audio data, has a set of phrases pre-selected as being of interest to a reviewer within a current audio analysis, identifies a plurality of audio segments within the streams of spoken audio data which match a plurality of phonemes for phrases pre-selected as of interest and places a reference for each instance of each phrase pre-selected as of interest into a metadata record for each stream of spoken audio data that has undergone the current audio analysis. Wherein, the phrase data store stores phoneme records for all phrases pre-selected as of interest where each phoneme record is associated with a human selectable identifier unique for the phrase pre-selected as of interest it embodies, and supplies the phoneme records to the audio analysis engine as requested. Finally, wherein the interaction manager displays the streams of spoken audio in which phrases pre-selected as of interest were identified.

According to another preferred embodiment of the invention, method for phrase identification and usage display from recorded audio, the method comprising the steps of: (a) receiving at least one audio stream containing at least one spoken interaction; (b) retrieving stored phoneme representations of at least one phrase pre-selected through use of a human selectable identifier to be of interest to an analyst reviewing the spoken interaction; (c) comparing phonemes present in each spoken interaction to the phoneme representations of phrases pre-selected to be of interest to the analyst; (d) placing a reference for each found instance of each phrase pre-selected to be of interest into a metadata record for each spoken interaction; (e) displaying, upon request, each spoken interaction that includes a particular phrase pre-selected to be of interest to the analyst.

As the delivery of phrases, which are made up of multiple words and syllables is inherently more complex than that of individual words, there can be very wide variances in pronunciation, syllable inflection and cadence associated with phrases and more than one audio representation of a single phrase may be required, each implementing a common or regional delivery variant to assure accurate capture of that phrase. Similarly, there may be more than one set of words that convey a single phrase's meaning and thus can be grouped as if one phrase. Other examples exist, but in each, multiple audio representations need to be available and may need to be associated with a single human selectable identifier of a phrase. The invention accounts for possible regional, dialectical and language differences through the use of multiple available language packs which can be used to generate the differing phoneme representations of a given phrase. It is also possible to introduce and convert externally recorded samples of the desired phrase into the system if a significant variant remains absent otherwise. Last, one can associate multiple phoneme representations to one human selectable identifier and the system will analyze the spoken language recording for each representation to identify the desired phrase.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

The inventor has conceived, and reduced to practice, various systems and methods for phrase labeling within spoken audio recordings.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "database" or "data store" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, key-value databases, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Conceptual Architecture

Figure 1:
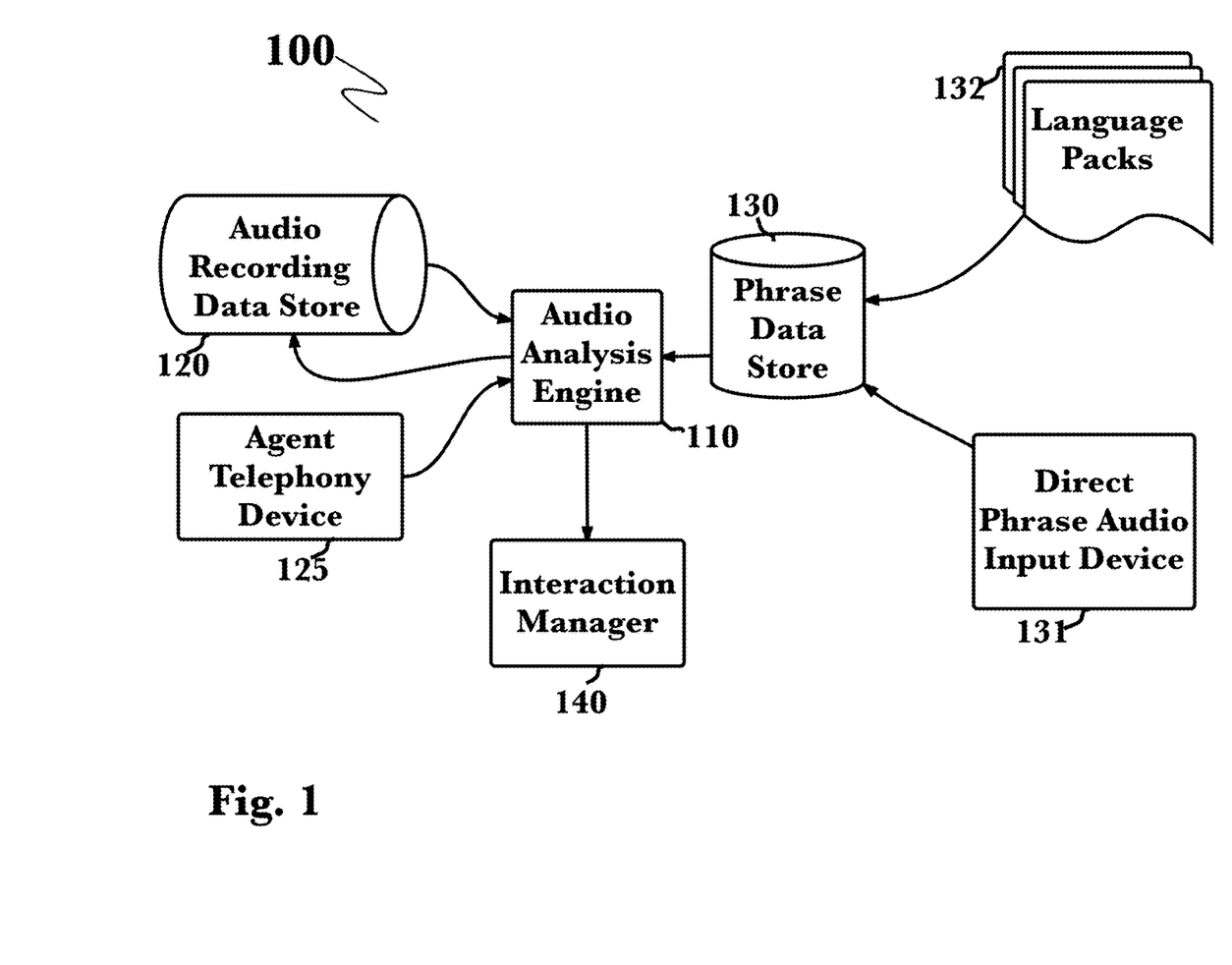
FIG. 1 is a diagram of an exemplary architecture of a system for phrase identification and phrase usage display within streams of spoken audio according to an embodiment of the invention.

FIG. 1 is a diagram of an exemplary architecture of a system for phrase identification and phrase usage display within streams of spoken audio 100 according to an embodiment of the invention. Using, as an example, recorded audio from a corporate contact center which may include both sales and service related telephone calls, recorded spoken interaction audio that has been selected by a reviewer (not depicted) to be analyzed is retrieved from the contact center's call audio recording data store 120 by the audio analysis engine 110. It is also possible to analyze 110 an agent-customer telephone call as it is occurring 125 while it is also being saved for later review 120. Within the audio analysis engine 110 the audio format of spoken interaction audio 120 or 125 may be converted for analysis. As an example, in many current corporate environments, original contact center call audio recordings might be packet captures (PCAP) from voice over Internet protocol (VoIP) telephony connections. The PCAP audio might be converted to uncompressed WAV or AIFF audio format prior to analysis so as to match the format of the phrase sample audio to which it is to be compared. Within the audio analysis engine, the converted audio stream representing output of the customer's telephony device and the audio stream representing input of the contact center agent's telephony device within the spoken interaction audio sample are split into separate tracks by methods already known within the art.

Figure 3:
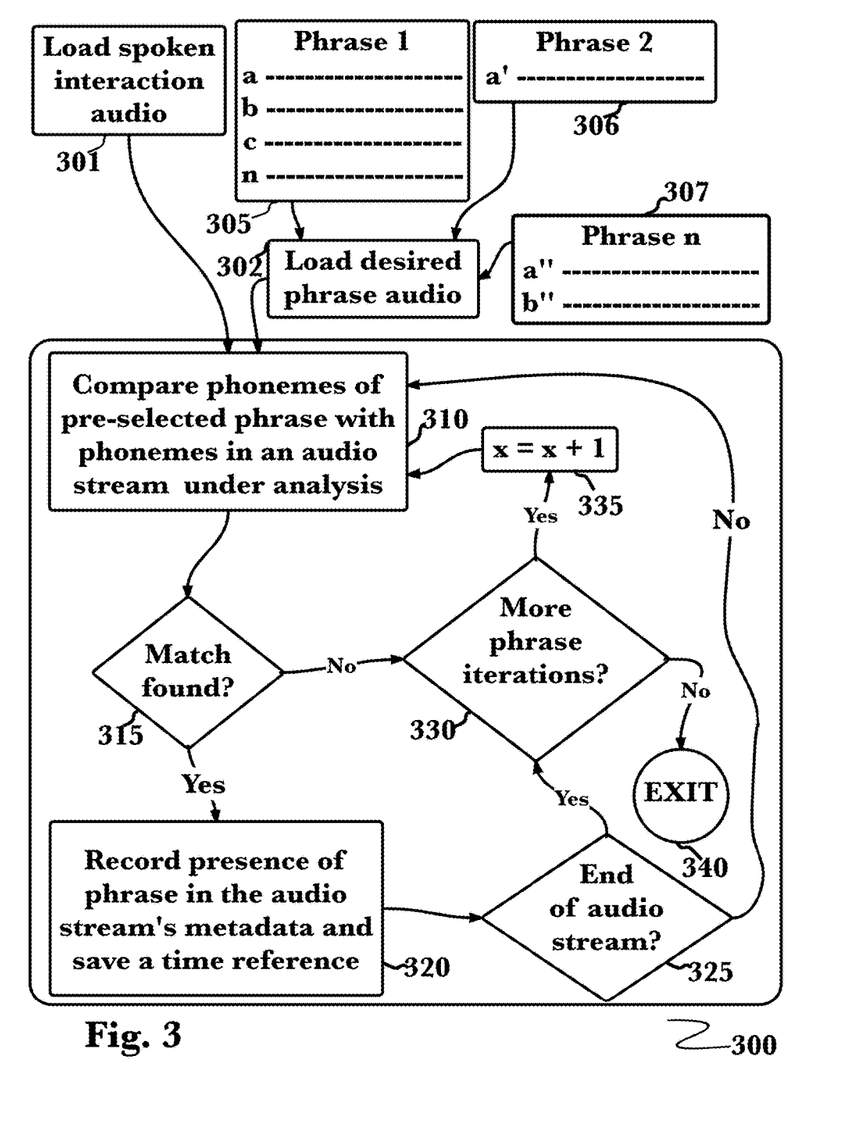
FIG. 3 is a process flow diagram of a method for the identification of a pre-selected phrase in an audio stream of spoken interaction according to an embodiment of the invention.

Phrases selected to be included in an analysis of spoken interaction audio recordings by a reviewer are retrieved from a phrase data store 130. Phrases are routinely entered into the data store 130 through use of the invention's language packs 132 which contains language packs containing standard generated waveforms and regional packs containing specialty waveforms for regional pronunciations, cadence differences, and homologues (such waveforms include the phonemes for the words within a specific language, dialect or regional pronunciation set). Phrases to be identified during an analysis are typed by the reviewer using natural language spelling for the language of interest; the system then parses the text and retrieves the phonemes for all words in the phrase from the appropriate language pack. The phoneme stream for the desired phrase is saved to the phrase data store 130 associated with a human selectable identifier, for example the natural language text for the phrase might serve as the human selectable identifier used to access it in the data store, although use of other identifiers is possible. There may be situations where multiple delivery patterns, for example pronunciation or syllable stress disparities, exist for a specific phrase which prevents a single phrase phoneme stream from matching an acceptable percentage of the phrase occurrences found in the spoken interactive audio recordings under analysis. The invention allots for this possibility by allowing multiple phrase phoneme 305a, 305b, 305c, 305n streams to be associated with a single human selectable identifier 305 and then comparing the spoken interaction recordings to each variant of the selected phrase. This capability also allows a reviewer to run phrase analysis for a phrase's meaning rather than an exact grouping of words. For example, in a sales setting, the phrases "We have decided not to buy that now" and "We have no need for that at this time" may be equivalent within the intent of the analysis despite their wording. Those two disparate word patterns could be grouped under one identifier and searched as a single phrase. Last, occasions may arise where the analysis requires an audio delivery of a phrase which is not available using the language packs 132. The invention accommodates this possibility by allowing entry of external audio samples through a direct phrase audio input device 131. The external audio sample can then be associated with a human selectable identifier within the phrase data store 130.

Figure 4:
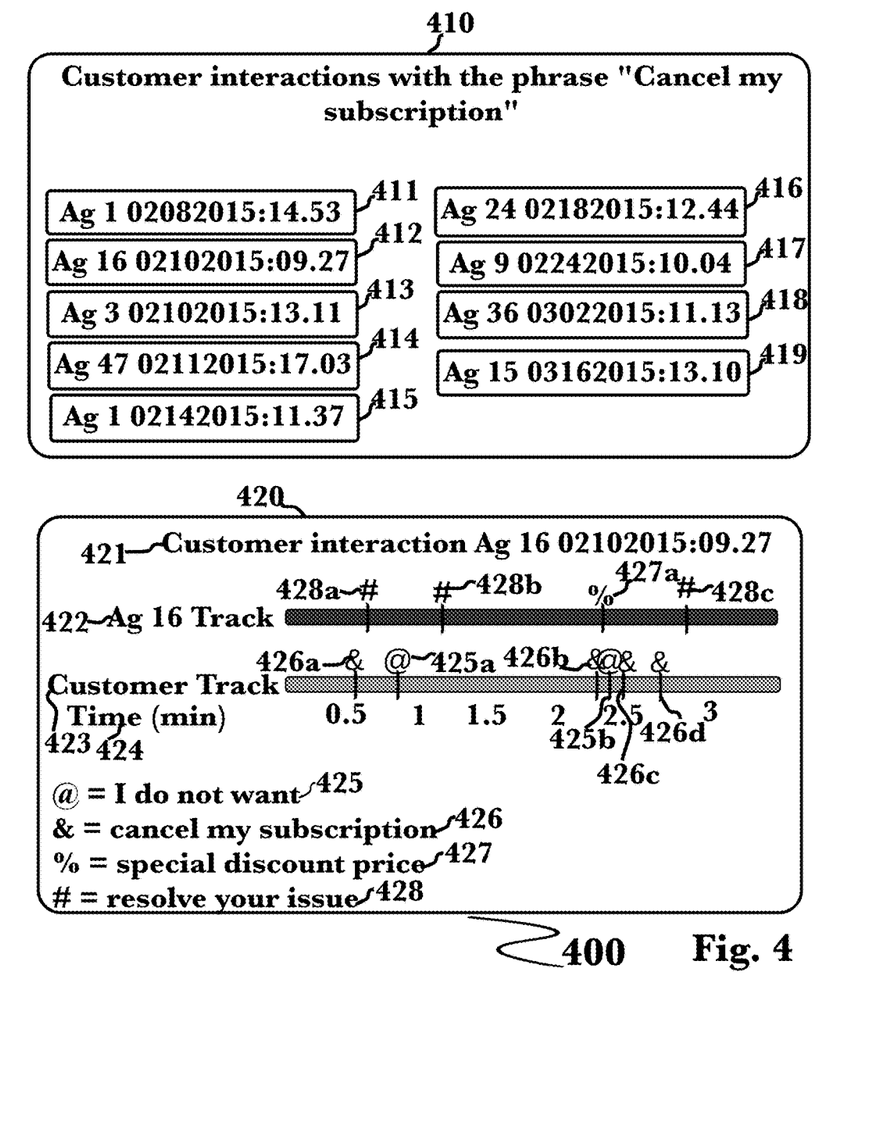
FIG. 4 is a method diagram showing the display of audio recordings of spoken interaction that include a particular phrase of interest and display of phrases of interest within a single audio recording according to an embodiment of the invention.

Within the audio analysis engine 110, digital representations of both the spoken interaction audio and the analysis phrases are created in multi-dimensional space. It is these digital representations that are compared. Phrase matches within a spoken interaction audio stream, along with the time point of each occurrence are placed in the metadata for the spoken interaction stream and that metadata stored in the audio recording data store 120. Resultant lists of spoken audio stream recordings that include one or more analysis phrases 410 can be reviewed at the interaction manager 140. Additionally, occurrences of the phrase within a single interaction recording might be reviewed as a bar graphic with each instance of a specific phrase marked by icon at the time point it is uttered 420 using the interaction manager 140. Selection of one of the icons allows the reviewer to start playback of the spoken audio recording at that time point.

Detailed Description of Exemplary Embodiments

Figure 2:
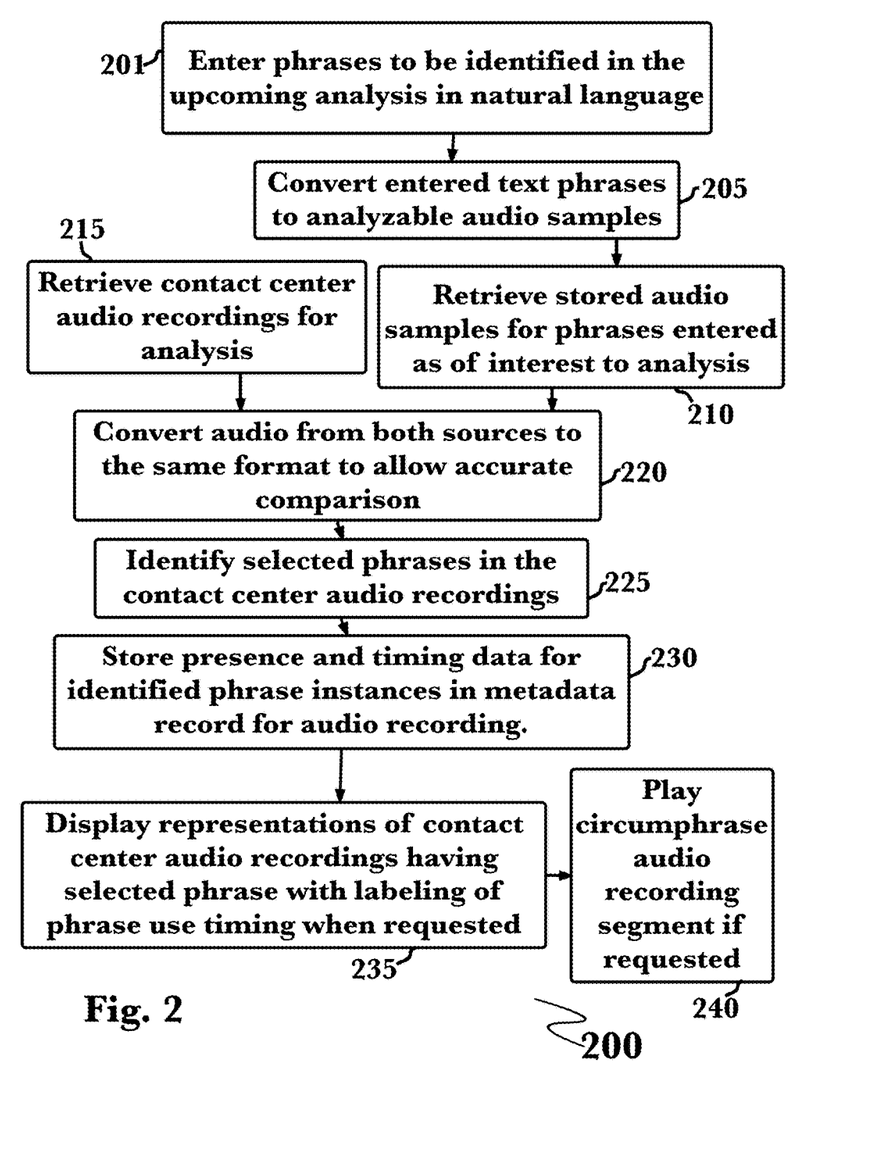
FIG. 2 is method diagram for phrase identification and phrase usage display within streams of spoken audio according to an embodiment of the invention.

FIG. 2 is method diagram for phrase identification and phrase usage display within streams of spoken audio 200 according to an embodiment of the invention. Phrases to be identified in an upcoming analysis are entered into the system 100, one by one, by the reviewer in natural language text 201. This phrase text is then parsed by the system, and converted into audio phoneme streams representative of the respective spoken phrase 205 using the invention's language packs 132. During analysis of spoken interaction audio, using contact center call audio recordings as an example, for presence of the selected phrases, both the recorded call audio and the phrase sample audio are retrieved from their respective data stores 215, 210 and converted to a common digital format that allows for comparison over multiple audio characteristics 220. Using this multi-dimensional digital format, phrases included in the analysis are identified in each of the contact center audio recordings being analyzed 225 and when instances of the phrase are found in the audio recording for a particular call, the presence of the phrase within the recording as well as the time point data within the call audio for each instance of the phrase are stored in the metadata of that call audio recording 230 for later recall and display 235. The invention allows for display of phrase use 235 which may include listing of all analyzed spoken interaction audio recordings in which a specific phrase is present at least once 410, display of the individual audio tracks within a single spoken interaction audio recording where the time points at which one or more phrases are present marked using icons representing each phrase 420, as well as summaries listing the number of times a particular phrase is used throughout the entire set of spoken interaction audio recordings analyzed, the percentage of audio recordings analyzed where a specific phrase is used, percentage of time when one analyzed phrase appears within a certain time period of a second analyzed phrase, just to list a few of the many possible options known to one skilled in the art. Given a depiction of the time points at which specific phrases are present 420, an analyst is able to select any of those phrase use instances to playback the spoken audio immediately surrounding that instance so as to gain a better understanding of the circumstances present leading up to and when the phrase was used 240.

FIG. 3 is a process flow diagram of a method 300 for the identification of a pre-selected phrase in an audio stream of spoken interaction according to an embodiment of the invention. Spoken interaction audio to be analyzed for the presence of one or more phrases of interest to a reviewer is loaded for analysis 301 along with one of the phrases 305, 306, 307 that are to be searched for during the analysis 302. Due to regional disparities in such spoken characteristics as delivery speed, emphasis of syllables, word pronunciation and even word make up of a given phrase, one "phrase" in the analysis may be made up of multiple phoneme representations for example, Phrase 1 305: 305a, 305b, 305c, 305n where "a" through "n" represent phoneme variants; and Phrase n 307: 307a" and 307b" where a" and b" represent phoneme variants. The invention accommodates this possibility by comparing each iteration of a specific phrase during the analysis 310. To begin, both the spoken language audio sample to be analyzed and an iteration of the phrase being tested are converted to a digital representation that allows the spoken audio sample and current phrase iteration, for example 305a, to be compared for multiple audio characteristics 310. Each time a match is found 315, a reference for presence of the phrase is made in the metadata for the spoken interaction under analysis 320. This process continues using the same phrase iteration 325, 310, for example 305a, until the end of the spoken interaction sample is reached 325 at which time it is determined whether any additional phrase iterations, for example 305b, exist 330 and if so 335, analysis of the current phrase continues 310, 315, 320. In the event that no matches of a specific iteration are found in the current spoken interaction sample 315 the next iteration is 335 is chosen until all iterations have been compared to the current spoken interaction audio 330 at which time analysis of the current spoken interaction audio and phrase combination ends 340 and that spoken interaction audio sample is analyzed against another phrase if one is available. When the set of phrases to be analyzed with a particular spoken interaction audio sample is exhausted, the spoken audio sample is stored in a compressed format such as mp3 for use as the audio in the review process (not depicted). This same process is repeated until all desired spoken interaction audio samples 301 are analyzed against all desired phrases 305, 306, 307.

FIG. 4 is a method diagram showing the display of audio recordings of spoken interaction that include a particular phrase of interest and display of phrases of interest within a single audio recording according to an embodiment of the invention 400. There are several useful ways in which the results of phrase identification analysis of spoken interaction audio data might be displayed using the invention. Using contact center telephone call audio recordings, one example is a listing of all of the call recordings, isolated from a large plurality of call recordings that include a specific target phrase, here "Cancel my subscription" is used 410. Such a listing might include the contact center agent, Ag 1 in the first list item 411, Ag 16 in the second 412, and so on 413, 414, 415, 416, 417, 418, and 419; followed by the date and time at which the flagged call occurred, Feb. 8, 2015 at 2:53 pm in the first listing 411, Feb. 10, 2015 at 9:27 am in the second listing 412, and so on 413, 414, 415, 416, 417, 418, and 419. Many variants of this simple (simple or sample?) listing exist, all of which the invention could display; the one chosen was for ease of disclosure. A second way to visualize results generated by the invention's ability to identify one or more phrases of interest in a plurality of spoken language audio samples is to focus on a single spoken interaction audio sample 420, in this case the second listing 412, 421 from the example analysis of contact center call audio samples 410 just described was chosen. In this example 420 the spoken audio tracks of agent 16 (Ag 16, 422) and the customer 423 are depicted as distinct bars. The separation of these two tracks 422 and 423 was accomplished by one of the methods previously known in the art as the invention does not rely on any one method. From the graphic 420, one can see that the spoken interaction analyzed lasted just under 3.5 minutes 424 and that the presence of four phrases, "I do not want" 425, "cancel my subscription" 426, "special discount price" 427 and "resolve your issue" 428, was analyzed. It should also be noted that the system has assigned a unique icon (@, 425), (&, 426), (%, 427), (#, 428) to each phrase which is then used to demarcate when each phrase occurs 425*a*, 425*b*, 426*a*, 426*b*, 426*c*, 426*d*, 427*a*, 428*a*, 428*b*, 428*c* in the call audio timeline 424 and which party in the spoken interaction speaks them, for example, the customer requests that his or her subscription be cancelled at approximately 0.5 minutes 426*a*, at approximately 2.5 minutes 426*b*, at approximately 2.75 minutes 426*c* and shortly after 3 minutes 426*d* whereas agent 16 offers a special discount price 427*a* at approximately 2.6 minutes into the recording. In a relevant example, this data could be used to easily and visually confirm that proper procedures for the contact center are being followed as without the reviewer having to listen to the majority or the entirety of the spoken interaction sample. In this example, perhaps offering the customer a discounted subscription price 427*a* after a second in-call subscription cancelation 426*b* request as an incentive to remain a subscriber is policy. It can be easily seen by a reviewer looking at the example display 420 that this policy was upheld, although without the desired outcome 426*c*, 426*d*. The invention could also allow for the audio surrounding a particular phrase utterance to be easily queued and listened to as selecting the timeline marker for a particular phrase identification, for example 428*b* in agent 16's track would position the start of playback of the complete spoken interaction Ag 16's 422 and the customer's 423 tracks possibly Ag 16 in the reviewer's right ear and the customer in the reviewer's left ear to better determine what transpired circum the speaking of the phrase.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
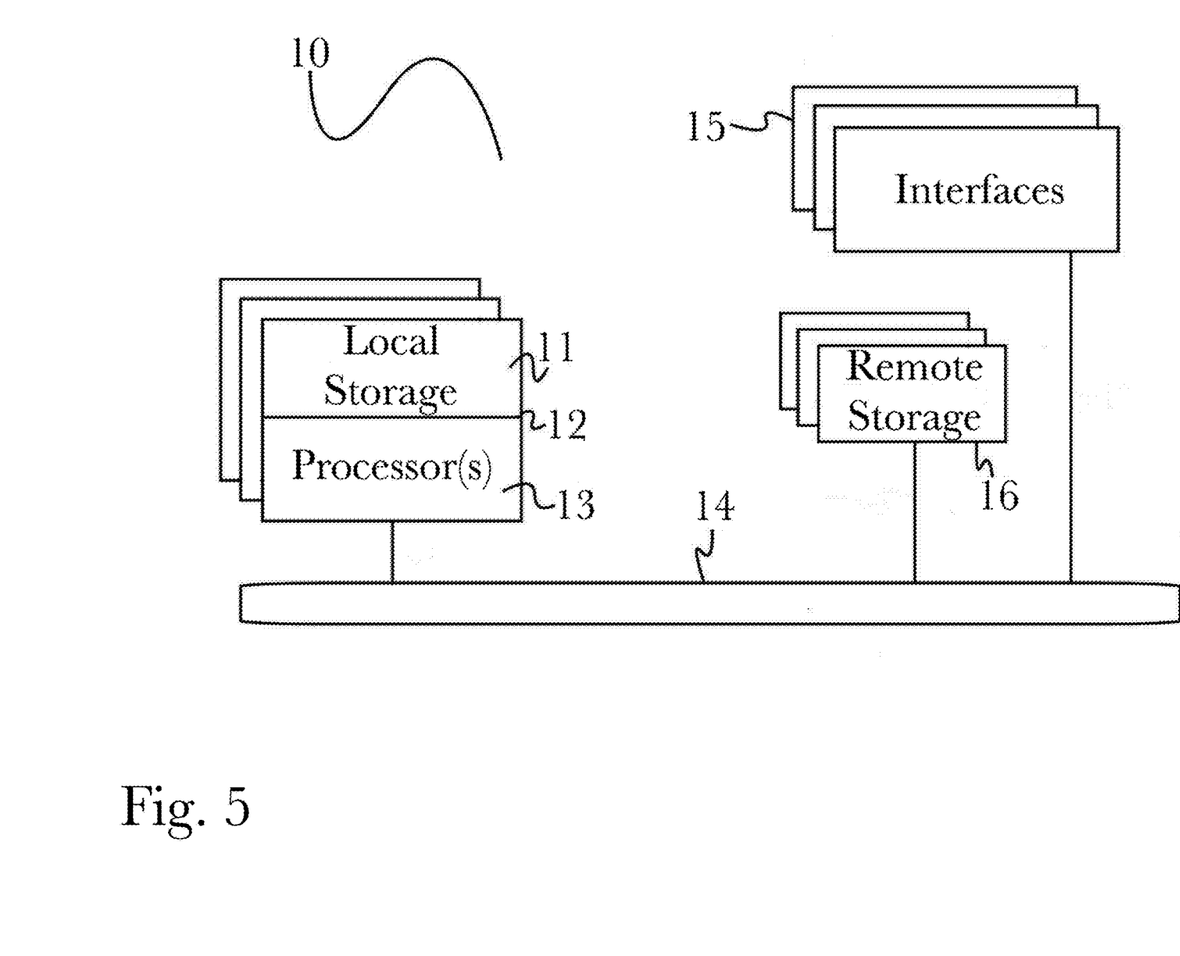
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software-or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
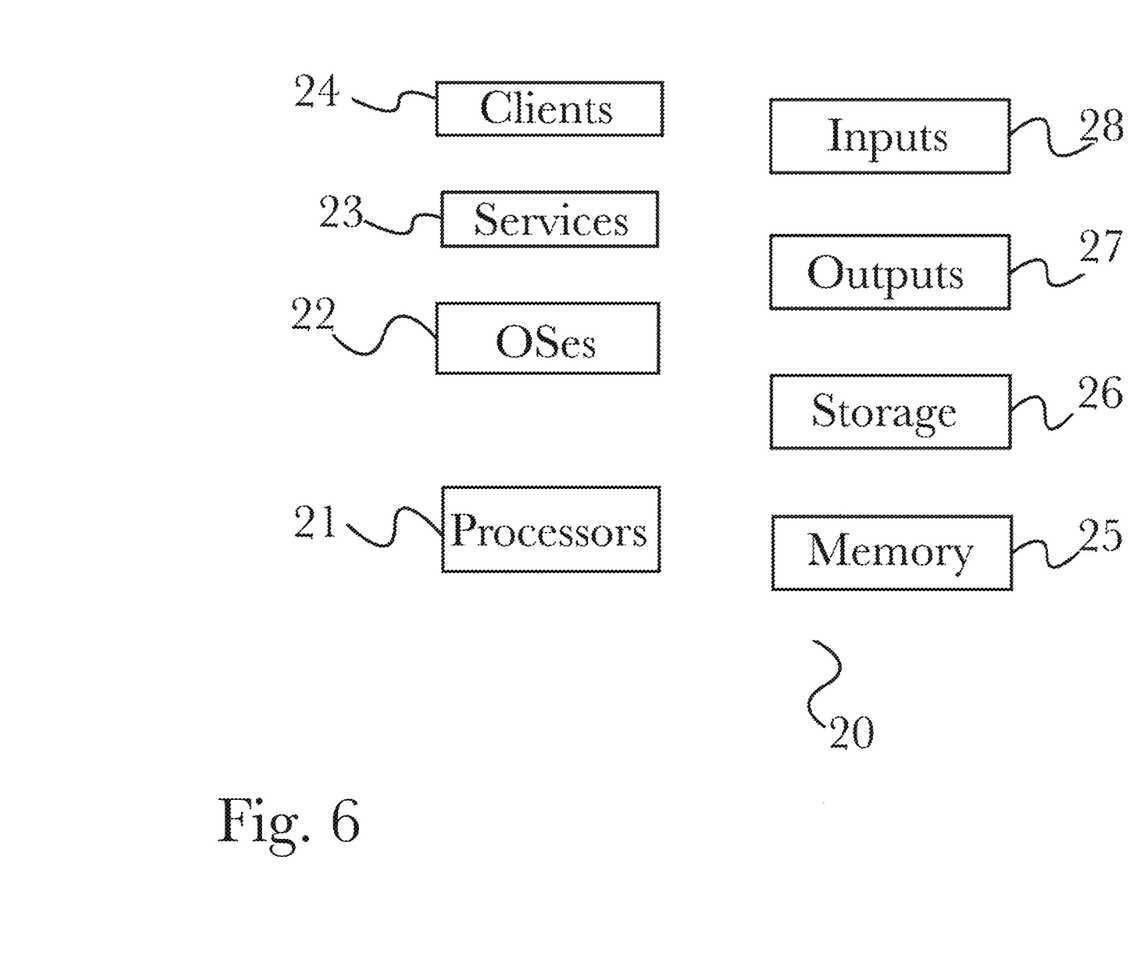
FIG. 6 is a block diagram illustrating an exemplary logical architecture for a client device, according to various embodiments of the invention.

In some embodiments, systems according to the present invention may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 7:
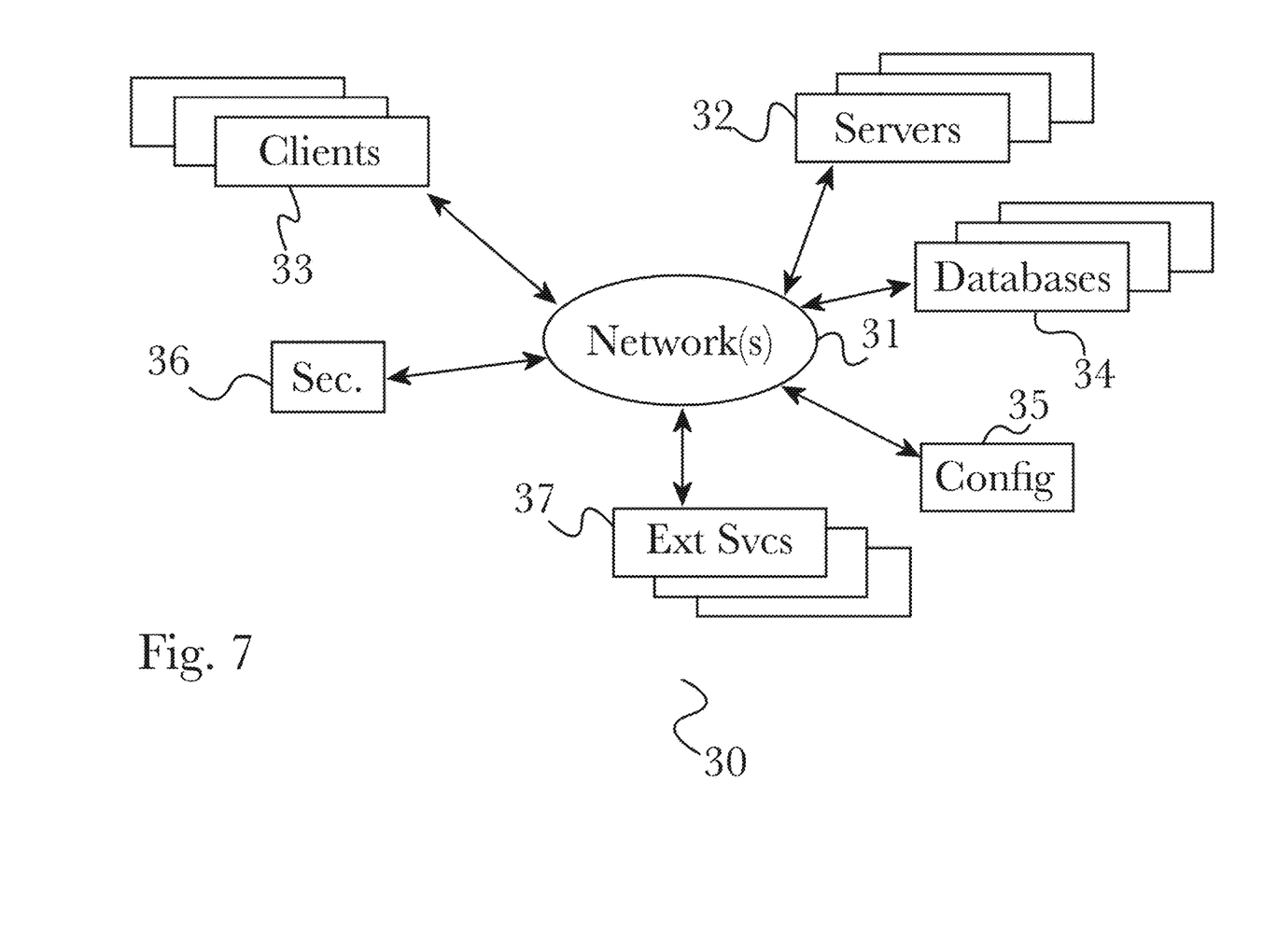
FIG. 7 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 7, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 8:
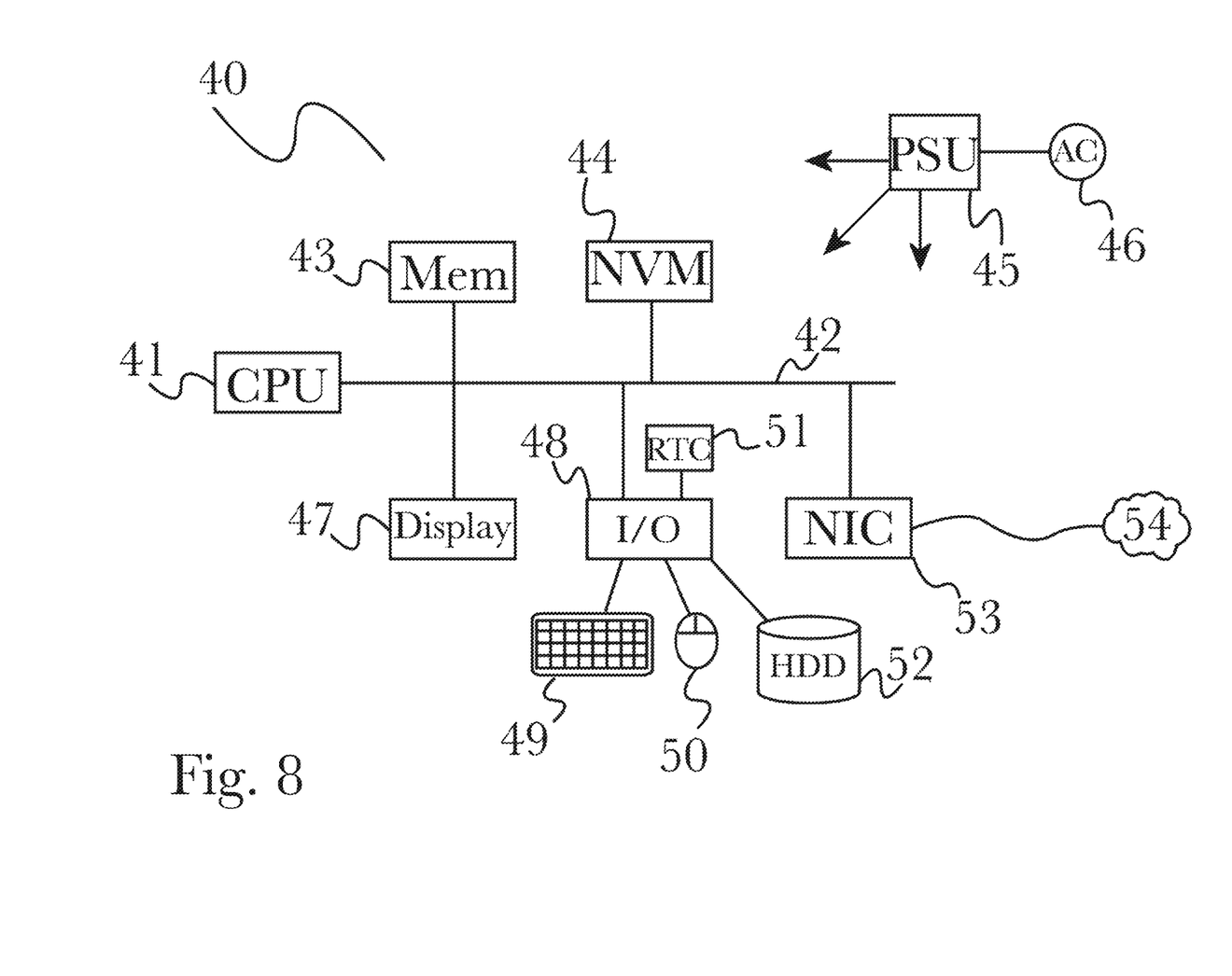
FIG. 8 is a block diagram illustrating an exemplary overview of a computer system as may be used in any of the various locations throughout the system.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

There are, of course a great plurality of additional ways that identified phrase data might be displayed or used that may be devised by one knowledgeable in the art. The examples above were chosen as representative and are not meant to imply any inability of the invention to process the data differently.

The skilled person will be aware of a range of possible modifications of the various embodiments described above. Accordingly, the present invention is defined by the claims and their equivalents.

What is claimed is:

1. A system for phrase identification and phrase usage display within streams of spoken audio comprising:
   a database which contains language packs containing standard generated waveforms and regional packs containing specialty waveforms for regional pronunciations, cadence differences, and homologues; and
   an audio analysis engine comprising at least a plurality of programming instructions stored in the memory of, and operating on at least one processor of, a computing device, wherein the plurality of programming instructions, when operating on the processor, cause the computing device to:

retrieve language packs and regional packs from the database;

receive streams of spoken audio data;

allow pre-selection of keywords and phrases as being of interest to a reviewer within a current audio analysis;

compare the waveforms in the language packs and regional packs to a plurality of audio segments within the streams of spoken audio data to identify a plurality of phonemes for phrases pre-selected as of interest; and place a reference for each instance of each phrase pre-selected as of interest into a metadata record for each stream of spoken audio data that has undergone the current audio analysis; and an interaction manager comprising at least a plurality of programming instructions stored in the memory of, and operating on at least one processor of, a computing device, wherein the plurality of programming instructions, when operating on the processor, cause the computing device to:

store in the database phoneme records for all phrases pre-selected as of interest, each phoneme record associated with a human selectable identifier unique for the phrase pre-selected as of interest that it embodies;

supply the phoneme records for all phrases pre-selected as of interest to the audio analysis engine as requested; and display the streams of spoken audio in which phrases pre-selected as of interest were identified.

2. The system of claim 1, wherein at least one human selectable identifier is associated with a plurality of phoneme records in the phrase data store to account for regional delivery differences.

3. The system of claim 1, wherein the reviewer can invoke an option to automatically position spoken audio stream playback start at a next or a previous instance of the phrase pre-selected as of interest.

4. A method for phrase identification and usage display from recorded audio, the method comprising the steps of:

(a) storing and retrieving language packs containing standard generated waveforms and regional packs containing specialty waveforms for regional pronunciations, cadence differences, and homologues;

(b) receiving at least one audio stream containing at least one spoken interaction;

(c) retrieving stored phoneme representations of at least one phrase pre-selected through use of a human selectable identifier to be of interest to an analyst reviewing the spoken interaction;

(d) comparing the waveforms in the language packs and regional packs to a plurality of audio segments within the streams of spoken audio data to identify a plurality of phonemes for phrases pre-selected as of interest;

(e) placing a reference for each found instance of each phrase pre-selected to be of interest into a metadata record for each spoken interaction;

(f) displaying, upon request, each spoken interaction that includes a particular phrase pre-selected to be of interest to the analyst.

5. The method of claim 4, wherein at least one human selectable identifier is associated with a plurality of phoneme records in the phrase data store to account for regional delivery differences.

6. The method of claim 4, wherein the reviewer can invoke an option to automatically position spoken audio stream playback start at a next or a previous instance of the phrase pre-selected as of interest.

* * * * *